US012355871B2

(12) United States Patent
Kannisto et al.

(10) Patent No.: US 12,355,871 B2
(45) Date of Patent: Jul. 8, 2025

(54) PAIRWISE KEY ESTABLISHMENT BETWEEN TWO MEASUREMENT STATES

(71) Applicant: QUALCOMM Incorporated, San Diego, CA (US)

(72) Inventors: Joona Verneri Kannisto, Salo (FI); Aseem Brahma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/193,582

(22) Filed: Mar. 30, 2023

(65) Prior Publication Data

US 2024/0333488 A1    Oct. 3, 2024

(51) Int. Cl.
  *H04L 9/08*    (2006.01)
(52) U.S. Cl.
  CPC .......... *H04L 9/0861* (2013.01); *H04L 9/0894* (2013.01)
(58) Field of Classification Search
  None
  See application file for complete search history.

(56) References Cited

U.S. PATENT DOCUMENTS

| | | | |
|---|---|---|---|
| 9,195,806 B1 | 11/2015 | Robinson | |
| 2009/0249492 A1 | 10/2009 | Boesgaard Sorensen | |
| 2015/0082048 A1* | 3/2015 | Ferguson | G06F 21/57 713/189 |
| 2015/0213253 A1* | 7/2015 | Miranda | G06F 21/51 726/17 |
| 2017/0180412 A1 | 6/2017 | Mikulski et al. | |
| 2017/0187526 A1 | 6/2017 | Ferguson et al. | |
| 2018/0109372 A1* | 4/2018 | Fu | H04L 9/083 |
| 2020/0356701 A1 | 11/2020 | Pruss et al. | |
| 2021/0211281 A1* | 7/2021 | Park | G06F 21/74 |

(Continued)

FOREIGN PATENT DOCUMENTS

| | | | |
|---|---|---|---|
| CN | 115361132 A | 11/2022 | |
| WO | WO2007097700 A2 * | 8/2007 | G06F 21/22 |

OTHER PUBLICATIONS

International Search Report and Written Opinion—PCT/US2024/019542—ISA/EPO—Jun. 21, 2024.

(Continued)

*Primary Examiner* — Paul R Fisher
(74) *Attorney, Agent, or Firm* — Polsinelli

(57) ABSTRACT

Systems and techniques are described for key establishment. For instance, a process can, during a first cryptographic key derivation, store a first trusted measurement value of a first entity in a first storage location, store an expected measurement value of a second entity in a second storage location, and generate a first instance of a cryptographic key using the first trusted measurement value, the expected measurement value, and a key derivation function (KDF). The process can, during a second cryptographic key derivation, obtain the expected measurement value as a second trusted measurement value of the second entity and store it in the second storage location, obtain the first trusted measurement value as a second expected measurement value and store it in the first storage location, and generate a second instance of the cryptographic key using the second expected measurement value, the second trusted measurement value, and the key derivation function.

25 Claims, 5 Drawing Sheets

(56) References Cited

U.S. PATENT DOCUMENTS

2022/0006620 A1 1/2022 Bursell et al.
2023/0299970 A1* 9/2023 Van Huis .............. H04L 9/3263
　　　　　　　　　　　　　　　　　　　　　　713/168

OTHER PUBLICATIONS

Tan H., et al., "A Confidential and Dos-resistant Multi-hop Code Dissemination Protocol for Wireless Sensor Networks", Proceedings of the Second Acm Conference on Wireless Network Security, Zurich, Switzerland, Mar. 16-18, 2009, New York, ACM, 2 Penn Plaza, Suite 701 New York, 10121-0701, USA, Mar. 16, 2009, pp. 245-252, XP058200450, abstract Chapter 1: "Introduction" Chapter 4: "Design and implementation" section 2.3: "Our contributions".

* cited by examiner

PAIRWISE KEY ESTABLISHMENT BETWEEN TWO MEASUREMENT STATES

FIELD

The present disclosure generally relates to key establishment for use by entities of devices in performing cryptographic operations. For example, aspects of the present disclosure relate to obtaining and providing inputs to a key derivation function.

BACKGROUND

Devices often use cryptographic keys to perform cryptographic operations (e.g., encryption and/or decryption) on data. In some cases, multiple entities (e.g., different software image versions, different components, different devices, etc.) may require access to such data (e.g., be able to decrypt encrypted data). However, in certain scenarios, the cryptographic key used to perform cryptographic operations may be derived based on one or more data items that differ between the multiple entities. Therefore, the entities may be unable to derive common cryptographic keys for using the data. According, systems and techniques are needed to allow different entities to derive the same cryptographic keys in order to allow the entities to access the data.

SUMMARY

Systems and techniques are described herein for pairwise key establishment between two entities to allow for derivation of a common cryptographic key using a key derivation function.

According to at least one example, a process for key establishment is provided. The process includes: during a first cryptographic key derivation: storing a first trusted measurement value associated with a first entity in a first secure storage location; storing an expected measurement value associated with a second entity in a second secure storage location; and generating a first instance of a cryptographic key using the first trusted measurement value, the expected measurement value, and a key derivation function; and during a second cryptographic key derivation: obtaining, after generating the first instance of the cryptographic key during the first cryptographic key derivation, the expected measurement value as a second trusted measurement value associated with the second entity; storing the second trusted measurement value in the second secure storage location; obtaining the first trusted measurement value as a second expected measurement value; storing the second expected measurement value in the first secure storage location; and generating a second instance of the cryptographic key using the second expected measurement value, the second trusted measurement value, and the key derivation function.

In another illustrative example, an apparatus for key establishment is provided. The apparatus includes at least one memory and at least one processor coupled to the at least one memory and configured to: during a first cryptographic key derivation: cause a first trusted measurement value associated with a first entity to be stored in a first secure storage location; cause an expected measurement value associated with a second entity to be stored in a second secure storage location; and generate a first instance of a cryptographic key using the first trusted measurement value, the expected measurement value, and a key derivation function; and during a second cryptographic key derivation: obtain, after generating the first instance of the cryptographic key during the first cryptographic key derivation, the expected measurement value as a second trusted measurement value associated with the second entity; cause the second trusted measurement value to be stored in the second secure storage location; obtain the first trusted measurement value as a second expected measurement value; cause the second expected measurement value to be stored in the first secure storage location; and generate a second instance of the cryptographic key using the second expected measurement value, the second trusted measurement value, and the key derivation function.

In another illustrative example, a non-transitory computer-readable medium is provided that has stored thereon instructions that, when executed by at least one processor, cause the at least one processor to: during a first cryptographic key derivation: cause a first trusted measurement value associated with a first entity to be stored in a first secure storage location; cause an expected measurement value associated with a second entity to be stored in a second secure storage location; and generate a first instance of a cryptographic key using the first trusted measurement value, the expected measurement value, and a key derivation function; and during a second cryptographic key derivation: obtain, after generating the first instance of the cryptographic key during the first cryptographic key derivation, the expected measurement value as a second trusted measurement value associated with the second entity; cause the second trusted measurement value to be stored in the second secure storage location; obtain the first trusted measurement value as a second expected measurement value; cause the second expected measurement value to be stored in the first secure storage location; and generate a second instance of the cryptographic key using the second expected measurement value, the second trusted measurement value, and the key derivation function.

In another illustrative example, an apparatus for key establishment is provided. The apparatus includes: during a first cryptographic key derivation: means for storing a first trusted measurement value associated with a first entity in a first secure storage location; means for storing an expected measurement value associated with a second entity in a second secure storage location; and means for generating a first instance of a cryptographic key using the first trusted measurement value, the expected measurement value, and a key derivation function; and during a second cryptographic key derivation: means for obtaining, after generating the first instance of the cryptographic key during the first cryptographic key derivation, the expected measurement value as a second trusted measurement value associated with the second entity; means for storing the second trusted measurement value in the second secure storage location; means for obtaining the first trusted measurement value as a second expected measurement value; means for storing the second expected measurement value in the first secure storage location; and means for generating a second instance of the cryptographic key using the second expected measurement value, the second trusted measurement value, and the key derivation function.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
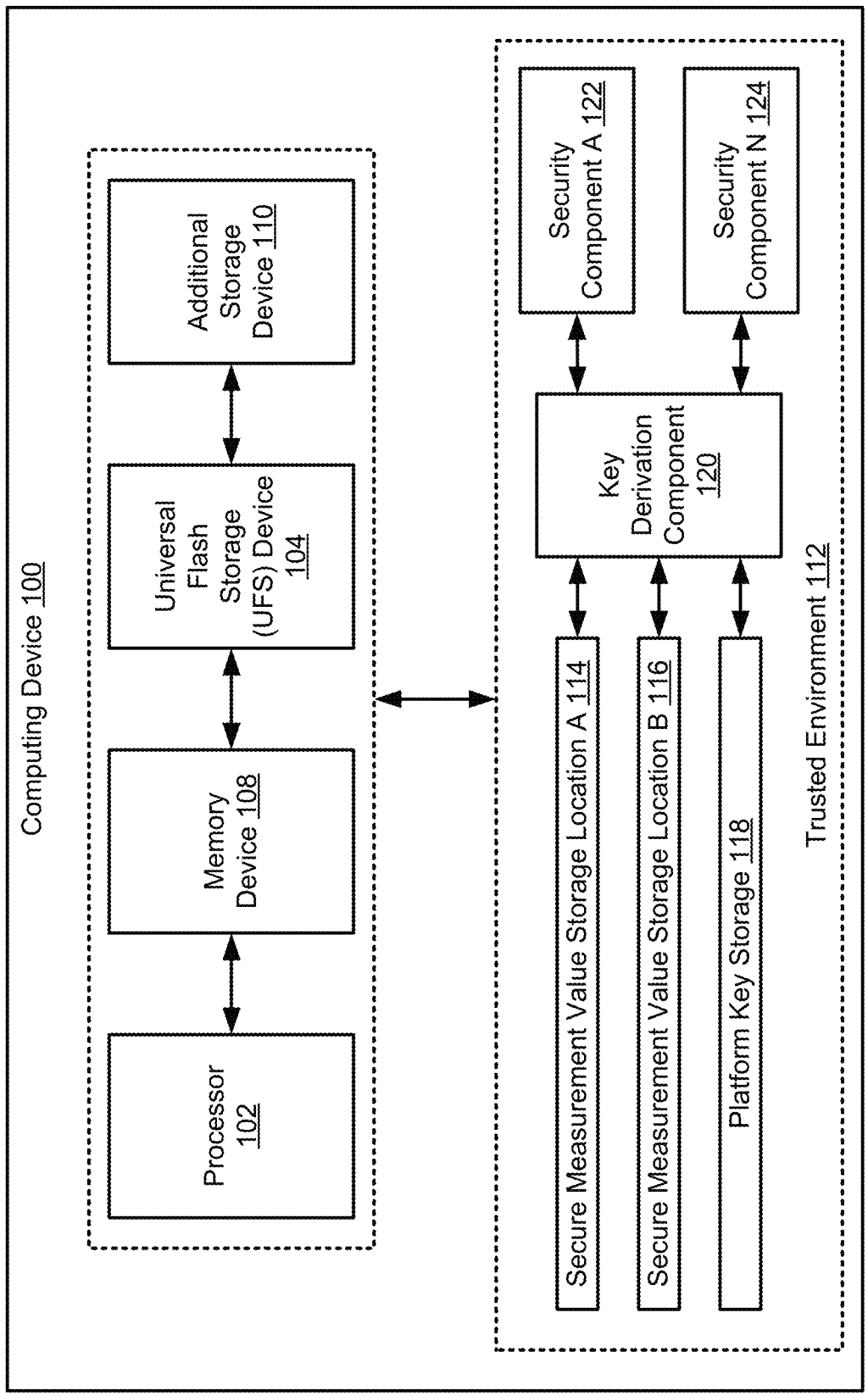
FIG. 1 is a block diagram illustrating certain components of a computing device, in accordance with one or more examples described herein.

Certain aspects and examples of this disclosure are provided below. Some of these aspects and examples may be applied independently and some of them may be applied in combination, as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named (or numbered) components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection (or any variation thereof), means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things, and/or may inadvertently share things, other than information, such as, for example, electrical current, radio frequency signals, power supply interference, interference due to proximity, interference due to re-use of the same wire and/or physical medium, interference due to re-use of the same register and/or other logical medium, etc.

Systems and techniques are described herein for common cryptographic key establishment for different entities. Said another way, systems and techniques described herein allow for a common cryptographic key to be generated by a key derivation function for at least two separate entities that require the cryptographic key to perform cryptographic operations on data that may be used and/or shared by the entities. A key derivation function can be any algorithm (e.g., at least partially implemented in hardware) that executes a function to produce an output based on one or more inputs (e.g., a platform key, etc.). The output can include, at least in part, a derived cryptographic key.

In some examples, an aggregate software image may be booted on a device. As used herein, an aggregate software image may be a set of any one or more software images loaded during the booting of a computing device. In some examples, when such an aggregate software image is booted on a computing device, a trusted measurement value may be obtained using the image. In some examples, a measurement value is any value (which may also be referred to as a parameter) obtained during a boot process of a device. In some examples, such a measurement value may be referred to as a trusted value when the measurement is obtained during a boot of a device and stored in a location that may not be re-written during subsequent operation of the device (e.g., in a write-once memory, some form of immutable storage, read-only memory, etc.). As an example, the trusted measurement value may include a cryptographic hash of the aggregate software image obtained via execution of a hashing function using the aggregate software images as an input. In some examples, the hash may be combined with any other information items (e.g., state information of the computing device, measured physical properties, etc.) to obtain the trusted measurement value. Such a trusted measurement value, along with a secure platform key, may be used with a key derivation function to obtain a cryptographic key to be used for performing cryptographic operations on data to be accessed and/or otherwise used by the aggregate software image. In some examples, as used herein, a platform key refers to any cryptographic key available to (at least) two entities that is a protected secret known only to one or more devices that include the two entities, such that the platform key is made available as an input for a key derivation function performed by and/or on behalf of the two entities. In some examples, using a platform key in combination with a measurement value unique to a software image prevents a classical signature forgery (e.g., performed using a quantum computer) granting access to device secrets to an unauthorized aggregate image. For instance, if the previous aggregate image does not authorize the new or updated image, the new image will not get access to secrets bound to device state. The authentication of the new or updated image can be performed by the previous measured image using cryptographic primitives that are quantum algorithm safe. Quantum protection can thus be provided by the mutable component and does not need to be added to the immutable software of the device.

In some examples, the trusted measurement value, obtained at boot time, is stored in a secure storage location. In some examples, the secure storage location is any storage location that may only be written to during a secure boot process, and may not be re-written thereafter (e.g., a write-once storage location). A computing device may be configured with any number of secure storage locations without departing from the scope of examples described herein. In some examples, the particular secure storage location to which the trusted measurement value is written is determined based, at least in part, on one or more parameters and/or information associated with the aggregate software image. As an example, the secure storage location may be selected based on a version number of the aggregate software image. As another example, the aggregate software image may include an instruction(s) indicating a particular secure storage location to which the trusted measurement value is to be written.

In some examples, an aggregate software image may require an update (e.g., to fix a security issue). Such an update may require an update to one or more portions of the aggregate software image. An update may alter the content of the aggregate software image such that a hash of the aggregate software image changes, as hashes of different information result in different hash values. Therefore, if an updated aggregate software image attempts to obtain a cryptographic key using a key derivation function (e.g., using a hash of the updated aggregate image rather than a hash of the original image), the cryptographic key may differ from the cryptographic key obtained by the aggregate software image prior to the update. Obtaining a different cryptographic key may render the information secured by the original cryptographic key unobtainable by the updated aggregate software image. Thus, a technique is needed to allow the aggregate software image and the updated aggregate software image to provide the same inputs to a key derivation function such that the cryptographic key generated is the same, allowing the updated aggregate software image to access data previously secured by the non-updated aggregate software image.

As another example, a particular component may need to share data with another component, where such data is subjected to cryptographic operations by the particular component. The components may be portions of the same computing device, or may be portions of separate computing devices (e.g., components of separate mobile computing devices). In such a scenario, the two components may again require the ability to generate the same cryptographic key to access the same data. Thus, again, a technique is needed to allow the components to generate the same cryptographic key.

In some examples, issues such as those described above may be addressed, at least in part, via a technique that uses at least two inputs to a key derivation function, along with a common platform key, to derive a cryptographic key. The two inputs may remain the same between two versions of an aggregate software image, and/or between two components, by manipulating the secure storage location of measurement values. Specifically, during one boot process, a first secure storage location may be used to store a trusted measurement value (e.g., of an initial aggregate software image or a first component), and a second secure storage location may be used to store an expected measurement value (e.g., of an updated aggregate software image or a second component). In some examples, during a subsequent boot (e.g., of the same device, of a separate component, etc.), the expected measurement value may be a second trusted measurement value obtained during the boot process (e.g., a hash, a serial number, etc.), and stored in the second secure storage location, and the first trusted measurement value may be obtained and stored in the first secure storage location. Thus, a key derivation function configured to use a common platform key and the values in the first and second secure storage location may have the same inputs, and thus output the same derived cryptographic key. As the secure resources are finite and populated by an immutable trusted part, a system with the platform secret but in another state will not be able to derive the same group secret.

In some examples, a computing device is configured with at least a first secure storage location and a second secure storage location (e.g., two separate platform control registers). In some examples, the first secure storage location may be configured such that it may only be written to once, during a boot of the computing device. The first secure storage location may thus be immutable during runtime of the computing device. The first secure storage location may be written with a first trusted measurement value obtained (e.g., measured) during a boot of a device, and that may only be written to once, during boot, by a component configured to obtain the measurement and write the measurement to the first secure storage location. In some examples, the first trusted measurement value is a hash value of a first aggregate software image being loaded during the boot process. In some examples, the first storage location may be written with a serial number of a component being initialized during the boot process. In either case, the first trusted measurement value may be a combination of information items (e.g., image hash, component serial number, etc.) with any other information of any type. As an example, an image hash or a component serial number may be combined with a value representing the state of the computing device to obtain the first trusted measurement value. Examples of state information may include, but are not limited to, values of one or more read-only registers of the computing device, measurements related to the operation of the computing device, etc. In some examples, the first trusted measurement value may be referred to as a boot time measurement.

In some examples, an expected measurement value is obtained. The expected measurement value may be any value chosen by the first aggregate software image, or by a first component, to represent an expected measurement value for an updated aggregate software image or a second component, respectively. As an example, a second trusted measurement value may be obtained, at least in part, by obtaining a hash value associated with an updated aggregate software image. As another example, the second trusted measurement value may be obtained, at least in part, using a serial number associated with a second component. In some examples, the expected measurement value may be a value that, if measured during a subsequent boot of a device (or any component therein), becomes a trusted measurement value. As an example, a known hash of an updated software image, or a known serial number (or other identifying information) of another component may be obtained as at least part of an expected measurement value, and may or may not be combined with some other information (e.g., a register state of the device) to generate the expected measurement value. In such an example, during a subsequent boot of the device (e.g., for different software versions), or during device operation (e.g., for separate device components), the obtained expected measurement value may become a trusted measurement value.

In some examples, the second trusted measurement value is stored in a second secure storage location (e.g., a second platform control register) that is writable after the first secure storage location has been rendered immutable (e.g., read-only). In some examples, the second trusted measurement value (e.g., the expected measurement value) is obtained using any suitable technique for obtaining information. As an example, an aggregate software image, executing on a computing device, may obtain an expected hash of an updated software image to be loaded (e.g., obtained over a network connection). As another example, a serial number of a separate component may be obtained, directly or indirectly, from the other component. In some examples, the expected measurement value is stored in the second storage location based at least in part on information associated with the first entity (e.g., an aggregate software image, a device component, etc.) and/or a second entity (e.g., an updated software image, a second device component, etc.). For example, a version number of an updated software image may determine the second secure storage location. As another example, the key derivation process contemplated herein may determine the first secure storage location based on the version number of an aggregate software image, and the second secure storage location may be determined by virtue of being the other secure storage location to be used in the key derivation process (e.g., when only two inputs plus a platform key are used to execute the key derivation function).

In some examples, the first trusted measurement value and the expected measurement value are used as input to a key derivation function, along with common platform key. In some examples, the common platform key is any cryptographic key available to two separate entities. As an example, a platform key may be stored in a particular storage location of a read-only hardware component (e.g., configured during a manufacturing process), and is accessible to software images executing on devices that include the hardware component (e.g., indirectly accessible to the software, such as via a key derivation function or via immutable software in the boot after which the key is locked). As another example, the platform key may be stored on a read-only hardware component of a device, and accessible only to certain other hardware components of that device. As another example, two separate devices made by the same manufacturer may each include a read-only hardware component that includes the common platform key.

In some examples, the first trusted measurement value, the expected measurement value, and the platform key are used as inputs to a key derivation function to derive a cryptographic key to be used for performing cryptographic operations (e.g., encryption and/or decryption of data) by the first entity (e.g., an initial aggregate software image, a first component, etc.).

However, for other entities to access and/or otherwise use the same data, the same cryptographic key may be required. Therefore, during a subsequent cryptographic key derivation, using the same key derivation function, the same inputs must be used. To achieve the same inputs, the content of the secure storage locations providing the input measurement values must be the same. To that end, in some examples, the secure storage locations of the expected measurement value and the first trusted measurement value may be flipped between subsequent boots of a computing device, or during boots of separate components.

In some examples, when the first trusted measurement value includes a hash of an initial aggregate software image, as discussed above, the first trusted measurement value is stored in a first secure storage location based on information associated with the initial aggregate software image (e.g., a version number of the image). An expected measurement value of an updated aggregate software image may then be stored in a second secure storage location, and the two measurement values may be used, along with a common platform key, to obtain a derived cryptographic key.

In some examples, when an updated aggregate software image is booted, the updated image has different associated information (e.g., a new version number) that dictates that the second secure storage location be used to store a trusted measurement value during the boot process, with the first secure storage location being writable by the updated aggregate software image. The first storage location may be written to with the trusted measurement value of the previous aggregate software image (e.g., an expected measurement value of the initial aggregate software image obtained by the updated aggregate software image). Thus, the first secure storage location still includes the trusted measurement value associated with the initial aggregate software image, the second secure storage location includes the trusted measurement value associated with the updated aggregate software image (which was previously the expected measurement value associated with the updated aggregate software image), and the platform key remains the same. As a result, in some examples, the inputs of the key derivation function (e.g., the platform key, the trusted measurement value associated with the initial aggregate software image, and the measurement value associated with the updated aggregate software image) remain the same, leading to the same derived cryptographic key. Therefore, the updated aggregate software image may access the same data (e.g., via cryptographic operations) as the initial aggregate software image.

In some examples, when the first trusted measurement value includes a serial number of a first component, as discussed above, the first trusted measurement value is stored in a first secure storage location during a boot of the computing device. The expected value in this scenario is information (e.g., another serial number) associated with a second component, and is stored in a second secure storage location during or after the boot process. In some examples, the trusted measurement value of the first component and the expected measurement value of the second component are used with the platform key as inputs to a key derivation function to obtain a derived cryptographic key to be used for performing cryptographic operations (e.g., encryption/decryption) of data to be commonly used by the two components. In some examples, the second component may be configured to store its own trusted measurement value (e.g., its own serial number) in a secure storage location during a boot process, obtain an expected measurement value associated with the first component (e.g., the serial number of the first component), and store the expected measurement value in another secure storage location, such that, when used as inputs, along with a common platform key, to a key derivation function, obtains an output of the same cryptographic key, thus allowing both components to have a shared derived cryptographic key for use in performing cryptographic operations on data shared by the two components.

Examples described herein may address the need to securely establish pair-wise cryptographic keys commonly derived between two entities when the entities, or all or any portion of one or more devices that include the entities, may be in different states (e.g., measurement states). In some examples, examples described herein provide for consistent inputs to a key derivation function when entities change states (e.g., during and/or after software updates) and/or separate components require common cryptographic abilities (e.g., the components will be operating on an at least partially common data set).

Various aspects of the techniques described herein will be discussed below with respect to the figures. FIG. 1 is a block diagram illustrating an example of a computing device 100. As shown, the computing device 100 includes a processor 102, a universal flash storage (UFS) device 104, a memory device 108, an additional storage device 110, and a trusted environment 112. The trusted environment 112 may include any number of secure measurement value storage locations (e.g., secure measurement value storage location A 114, secure measurement value storage location B 116), a platform key storage 118, a key derivation component 120, and any number of security components (e.g., security component A 122, security component B 124). Each of these components is described below.

The computing device 100 is any device, portion of a device, or any set of devices capable of electronically processing instructions and may include, but is not limited to, any of the following: one or more processors (e.g. components that include integrated circuitry, memory, input and output device(s) (not shown), non-volatile storage hardware, one or more physical interfaces (e.g., input/output (I/O) interfaces), any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the processor 102 is any component that includes circuitry for executing instructions (e.g., of a computer program). As an example, such circuitry may be integrated circuitry implemented, at least in part, using transistors implementing such components as arithmetic logic units, control units, logic gates, registers, first-in, first-out (FIFO) buffers, data and control buffers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 108) of the computing device 100. A processor may perform various operations for executing software, such as operating systems, applications, etc. The processor 102 may cause data to be written from memory to storage of the computing device 100 and/or cause data to be read from storage via the memory. Examples of processors include, but are not limited to, central processing units (CPUs), graphics processing units (GPUs), neural processing units, tensor processing units, display processing units, digital signal processors (DSPs), finite state machines, etc. The processor 102 may be operatively connected to the memory device 108, any storage (e.g., UFS device 104, additional storage device 110) of the computing device 100, and/or to all or any portion of the trusted environment 112. Although FIG. 1 shows the computing device 100 having a single processor 102, the computing device may include any number of processors without departing from the scope of examples described herein.

In some examples, the computing device 100 includes a universal flash storage (UFS) device 104. In some examples, the UFS device 104 is a flash storage device conforming to the UFS specification. The UFS device 104 may be used for storing data of any type. Data may be written to and/or read from the UFS device 104. As an example, the UFS device may store operating system images, software images, application data, etc. The UFS device 104 may store any other type of data without departing from the scope of examples described herein. In some examples, the UFS device 104 includes NAND flash storage. The UFS device 104 may use any other type of storage technology without departing from the scope of examples described herein. In some examples, the UFS device 104 is capable of data rates that are relatively faster than other storage devices (e.g., additional storage device 110) of the computing device 100. The UFS device 104 may be operatively connected to the processor 102, the memory device 108 the additional storage device 110 and/or to all or any portion of the trusted environment. Although FIG. 1 shows the computing device 100 having a single UFS device 104, the computing device may include any number of UFS devices without departing from the scope of examples described herein. Additionally, although FIG. 1 shows the UFS device 104, the computing device 100 may include any other type of flash storage device without departing from the scope of examples described herein.

In some examples, the computing device 100 includes an additional storage device 110. In some examples, the additional storage device is any one or more non-volatile storage devices. The additional storage device 110 may, for example, be a persistent memory device. In some examples, the additional storage device 110 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the additional storage device 110 as part of the computing device 100, the additional storage device may be separate from and operatively connected to the computing device 100 (e.g., an external drive array, cloud storage, etc.). In some examples, the additional storage device 110 operates at a data rate that is relatively slower than the UFS device 104. In some examples, the additional storage device 110 is also a UFS storage device. In some examples, the additional storage device 110 is operatively connected to the processor 102, the UFS device 104, the memory device 108, and/or to all or any portion of the trusted environment 112. Although FIG. 1 shows the computing device 100 having a single additional storage device 110, the computing device 100 may have any number of additional storage devices without departing from the scope of examples described herein.

In some examples, the computing device 100 includes a memory device 108. The memory device may be any type of computer memory. In some examples, the memory device 108 is a volatile storage device. As an example, the memory device 108 may be random access memory (RAM). In one or more examples, data stored in the memory device 108 is located at memory addresses, and is thus accessible to the processor 102 using the memory addresses. Similarly, the processor 102 may write data to and/or read data from the memory device 108 using the memory addresses. The memory device 108 may be used to store any type of data, such as, for example, computer programs, the results of computations, etc. In some examples, the memory device 108 is operatively connected to the processor 102, the UFS device 104, the additional storage device 110, and/or to all or any portion of the trusted environment 112. Although FIG. 1 shows the computing device 100 having a single memory device 108, the computing device 100 may have any number of memory devices without departing from the scope of examples described herein.

In some examples, the computing device 100 includes the trusted environment 112. The trusted environment 112 may be any hardware (e.g., circuitry), software, firmware, or any combination thereof configured to perform various services that may secure the computing device 100. Examples of such services may include, but are not limited to, performing various operations for executing various cryptographic service types, providing secure boot functionality, managing cryptographic keys, cryptographic key derivation, etc. Examples of the trusted environment 112 include, but are not limited to, secure execution environments, trusted management environments, trusted execution environments, trust zones, trusted platform modules, secure elements, etc. The trusted environment 112 may be operatively connected to the processor 102, the UFS device 104, the additional storage device 110, and/or the memory device 108. Although FIG. 1 shows the computing device 100 as having a single trusted environment 112, the computing device 100 may include any number of trusted environments without departing from the scope of examples described herein. Additionally, although FIG. 1 shows a variety of components (described below) as being included in a single trusted environment 112, all or any portion of the components shown within the trusted environment 112 may be in different secure execution environments (not shown) of the computing device 100, and/or not in a secure execution environment (e.g., being part of a rich execution environment).

In some examples, the trusted environment includes any number of secure measurement value storage locations (e.g., the secure measurement value storage location A 114, the secure measurement value storage location B 116). In some examples, a secure measurement value storage location is any hardware (e.g., circuitry), software, firmware, or any combination thereof configured to securely store information of any type. Such information may be or include a measurement value.

In some examples, a secure measurement value storage location is any location or medium for storing data to which the writing is limited in some way. As an example, a secure measurement value storage location (e.g., 114, 116) may be a register (e.g., a platform control register) configured to only be written to once (e.g., a write-once storage device) during a secure boot process, that is immutable thereafter for all or any portion of the time the computing device 100 continuously operates (e.g., remains powered on). A different register (e.g., a second platform control register) may be configured to be written to during a secure boot process by an entity associated with generating inputs for a key derivation function, and may include any information (e.g., an expected measurement value based on an obtained hash of an updated software image, a serial number of another component, etc.) Other examples of secure measurement value storage locations may be used without departing from the scope of examples described herein (e.g., immutable memory devices, one-time programmable devices, fuse-based devices, registers, other volatile or non-volatile storage, etc.). Although FIG. 1 shows the computing device 100 as having two security measurement value storage locations, the computing device 100 may include any number of such storage locations without departing from the scope of embodiments described herein.

In some examples, the platform key storage 118 is any suitable location and/or medium for storing data of any type. As an example, the platform key storage 118 may be any type of storage discussed above with respect to the secure measurement storage locations (114, 116). As another example, the platform key storage 118 may be a hardware component configured during a manufacturing process to include certain immutable secret data. In some examples, such data may be referred to as a platform key. As used herein, the term platform key may refer to any cryptographic key that may be embedded in some manner to one or more devices (which may be the same or similar devices) such as the computing device 100 such that the platform key may be obtained by entities (e.g., hardware components, software components, etc.) of a given device, but not by other devices (e.g., the platform key is not a shared secret). Although FIG. 1 shows the computing device 100 as having one platform key storage 118, the computing device 100 may include any number of such storage locations for storing any number of platform keys without departing from the scope of embodiments described herein.

In some examples, the secure measurement value storage locations (e.g., 114, 116) and the platform key storage 118 are each operatively connected to a key derivation component 120. In some examples, the key derivation component 120 is any hardware, software, firmware, or any combination thereof configured to execute a key derivation function for generating any number of derived cryptographic keys. In some examples, a key derivation function is any algorithm, which may be at least partially implemented in hardware, that takes one or more inputs, executes a function to produce an output based on the one or more inputs, where the output is, at least in part, a derived cryptographic key. The inputs may include, but are not limited to, a platform key (e.g., stored in the platform key storage 118), and any number of other inputs (e.g., the contents of the secure measurement value storage locations).

As used herein, a measurement value may be any item of information based on, associated with, derived from, or otherwise corresponding to any other one or more items of information. Measurement values may be, include, or otherwise be related to any item of information of a computing device 100. Examples include, but are not limited to, hash values associated with aggregate software images, serial numbers or other identifying information items associated with device components, physical values measured during operation of a computing device, state information of a computing device at a given time (e.g., the content of one or more registers), etc. In some examples, a measurement value is a combination of any one or more of the aforementioned examples and/or any other type of measurement value. As an example, a measurement value may be a hash of a software image being loaded during a secure boot process combined with a measured state value of a register of a computing device at a certain point during the boot process.

A measurement value may be referred to as a trusted measurement value or an expected measurement value. In some examples, a trusted measurement value is a measurement value obtained during a secure boot process. As an example, during a secure boot process, the trusted environment 112 may be configured to validate one or more software images to be loaded by obtaining a hash of the one or more software images (e.g., an aggregate software image), and obtaining a certain value from a particular register, and combining the two items of information to form a trusted measurement value. An expected measurement value may be a data item of any type obtained in any manner. As an example, an expected measurement value may be, be based on, or otherwise include a hash value of an updated aggregate software image obtained by the trusted environment 112 during a secure boot process from a repository of such information available to the trusted environment (e.g., over a network). The expected measurement value may be a combination of a value so obtained and another measured value of the computing device 100 (e.g., an item of state information).

Thus, in some examples, a trusted measurement value is trusted as the one or more items of information used for the trusted measurement value are measured during a secure boot of a device. The expected measurement value, in some examples, is based at least in part on an item of information (e.g., the hash of a software image update that has not yet been applied, a serial number of another component, etc.) that is obtained rather than measured. In some examples, this difference in measurement values may be used to generate cryptographic keys for different entities in a variety of scenarios that are secure between different measurement states of a computing device (e.g., 100).

As an example, a trusted measurement value may be used as one input to a key derivation function (discussed above), an expected measurement value may be used as a second input to the key derivation function, and a platform key (discussed above) may be used as a third input to the key derivation function. The key derivation function may then be executed (e.g., by the key derivation component 120) to produce, as an output, a derived cryptographic key. If the key is to be used by two separate entities (e.g., a verst version of an aggregate software image and an updated version, between two components of a device, etc.), then the same cryptographic key should be generated for each entity. The derivation of the same key may be achieved, in some examples, by providing the same inputs to the key derivation function. Presuming the platform key remains common, causing the measured value inputs to be the same may require configuring one or more elements of the trusted environment 112, and/or any component therein to cause the values of secure measured value storage locations (e.g., 114, 116) to remain the same between different measurement states of a computing device, and/or component therein.

As an example, the trusted environment may be configured to determine one secure measurement value location (e.g., 114) to be the storage location for the trusted measurement value during a secure boot process. Such a determination may be made, for example, based on any item of information (e.g., software version number) associated with an aggregate software image to be loaded. The trusted environment 112 may be further configured to obtain an expected measurement value (described above) and store the expected measurement value in a second secure measurement value storage location (e.g., 116). While the aggregate software image is executing (e.g., during a secure boot process prior to a reboot after a software update), the two secure measurement value storage location values, and the platform key, may be provided to a key derivation function (discussed below) to derive one or more cryptographic keys for use by software of the aggregate software image to perform any number of cryptographic operations (e.g., encrypting and/or decrypting data). Data on which cryptographic operations are performed (e.g., decrypted data) may be required during operation of the computing device 100 after a software update has been performed.

As an example, during a boot process, a first aggregate software image may be loaded, and a trusted measurement value obtained and stored in a configured write-once secure storage location. The aggregate software image may be configured to check for software updates, which may then be obtained. The trusted environment 112 may be configured to obtain a hash value as at least part of an expected measurement value of the planned updated version of the aggregate software image. The expected measurement value may be stored in a second secure measurement value storage location (which may also be pre-configured or determined based on any information), and used as part of the key derivation process. Upon reboot, a secure boot process continues with the updated aggregate software image executing. During this boot, the updated aggregate software image is used to obtain the trusted measurement value, which is stored in the second secure measurement storage location during the present boot based the updated aggregate software image having a different version number than the previous aggregate software image. The trusted environment 112 may be configured to obtain information associated with the previous aggregate software image, generate an expected measurement value for the previous aggregate software image, and store the value in the first secure measurement value storage location, as configured.

Such a configuration may cause the values of the two secure measurement value storage locations to remain the same between subsequent boots (as the locations of the trusted and expected values are switched, but remain the same values based on the information used to obtain the values remaining the same). Thus, when the trusted measurement value generated during the first boot and obtained as an expected measurement value during the second boot match, and vice versa for the updated aggregate software image, and the storage locations for each are as described above, the inputs to the key derivation function remain the same. Therefore, as the inputs to the key derivation function may remain the same, a common one or more cryptographic keys may be derived for the updated aggregate software image that match the one or more cryptographic keys previously derived for the previous aggregate software image during the previous boot. Therefore, the updated aggregate software image may be able to access or otherwise use data previously used by the previous aggregate software image that may have been protected by the cryptographic keys derived during the previous boot. Said another way, the aggregate software image and the updated aggregate software image may be capable of having common cryptographic keys derived for use in performing cryptographic operations on common data, based on matches between trusted measurement values and expected measurement values between different measurement states (e.g., different boots during a secure boot process) of a computing device.

As another example, two components (not shown in FIG. 1) of the computing device 100 may require access to common data (e.g., an input/output component and a display generation component). In some examples, such data may be subject to cryptographic operations. Therefore, similar to the example described above, each component may generate a trusted measurement value based at least in part on information (e.g., a serial number) associated with itself, and obtain an expected measurement value (e.g., a serial number) associated with the other component. The first component may be configured such that the two measurement values are stored in a certain order in secure measurement value storage locations being provided as inputs to a key derivation function instance. The second component may be configured to do the same, but in reverse order, which providing the same inputs to the same key derivation function instance or to a separate instance of the key derivation function. Thus, when the trusted and expected measurement values associated with the first component values, the same is true for the second component, and a shared secret (e.g., a platform key) is commonly available for the two components, the same cryptographic keys may be derived for the two components between different measurement states (e.g., due to being performed by different components, at different points in time, etc.). Such components may be separate from or included in any one or more trusted environments (e.g., 112) of the computing device 100.

In some examples, as discussed above, the determination of which secure measurement value storage location (e.g., 114, 116) is configured to store either a trusted measurement value or an expected measurement value may be performed using any technique for determining where data is stored. As an example, a trusted environment (e.g., 112) may be configured to determine a location for a trusted measurement value based on an item of information (e.g., version number, component-identifying information, etc.), and configured to use a separate location for the expected measurement value. In some examples, after a state change (e.g., software update followed by reboot, during boot of separate components, etc.), the trusted environment may be configured to reverse the locations in which the measurement values are stored, at least in respect to the configuration of the inputs to a key derivation function. Such a reversal causes the inputs to remain the same between measurement states, thereby allowing for the aforementioned common cryptographic key derivation(s).

In some examples, the computing device 100 includes any number of security components (e.g., the security component 122, the security component 124). The security components 122 and 124 may be any component capable of performing various cryptographic services, and may thus be any hardware (e.g., circuitry), software, firmware, or any combination thereof. In some examples, the security components are sub-chip hardware components of a system on a chip (SoC), which may include other components shown in FIG. 1 such as, for example, the processor 102. Any other components of the computing device 100 may also be included as part of an SoC without departing from the scope of examples described herein. In some examples, the security components exist in a data path between storage devices (e.g., UFS storage device 104, additional storage device 110) and the memory device 108, and/or data paths between the processor 102 and the memory device 108 or any of the storage devices (e.g., 104, 110). In some examples, all or any portion of the security components may be considered "inline" cryptographic engines. In some examples, the security components (e.g., 122, 124) are configured to perform any number of cryptographic service types on data being read from or written to a storage device (e.g., UFS device 104, additional storage device 110) and/or a memory device 108 of the computing device 100. In some examples, all or any portion of the data passing from memory to storage, from storage to memory, or to or from the processor 102 of the computing device 100 passes through a security component (e.g., 122, 124). In some examples, the security components (122, 124) are configured to use cryptographic keys derived as described herein by key derivation functions to perform any number of cryptographic operations (e.g., encryption, decryption, authentication, validation, etc.). Although FIG. 1 shows the trusted environment as having two security components (122, 124), the trusted environment 112 and/or the computing device 100 may include any number of security components without departing from the scope of examples described herein.

While FIG. 1 shows a certain number of components in a particular configuration, one of ordinary skill in the art will appreciate that the computing device 100 may include more components or fewer components, and/or components arranged in any number of alternate configurations without departing from the scope of examples described herein. Additionally, some or all of the components shown may be part of a single component, and any single component shown may be implemented as any number of discrete components. As an example, although FIG. 1 shows a variety of components as being included in the computing device 100, all or any portion of such components may be separate from and operatively connected to the computing device 100 without departing from the scope of examples described herein. Additionally, although not shown in FIG. 1, one of ordinary skill in the art will appreciate that the computing device 100 may execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 1.

Figure 2A:
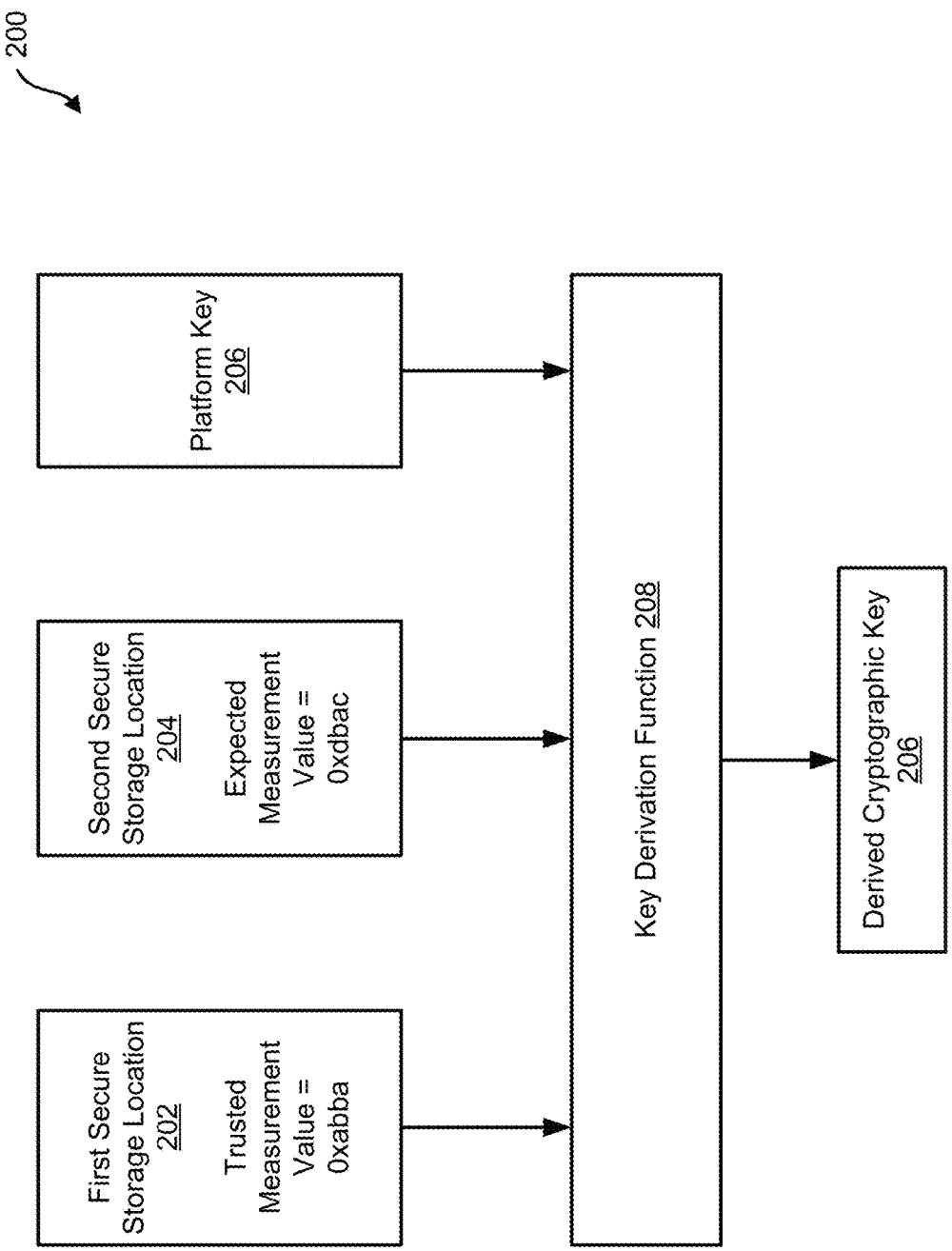
FIG. 2A is a block diagram illustrating an environment for deriving a cryptographic key during a first measurement state, in accordance with one or more examples described herein.
Figure 2B:
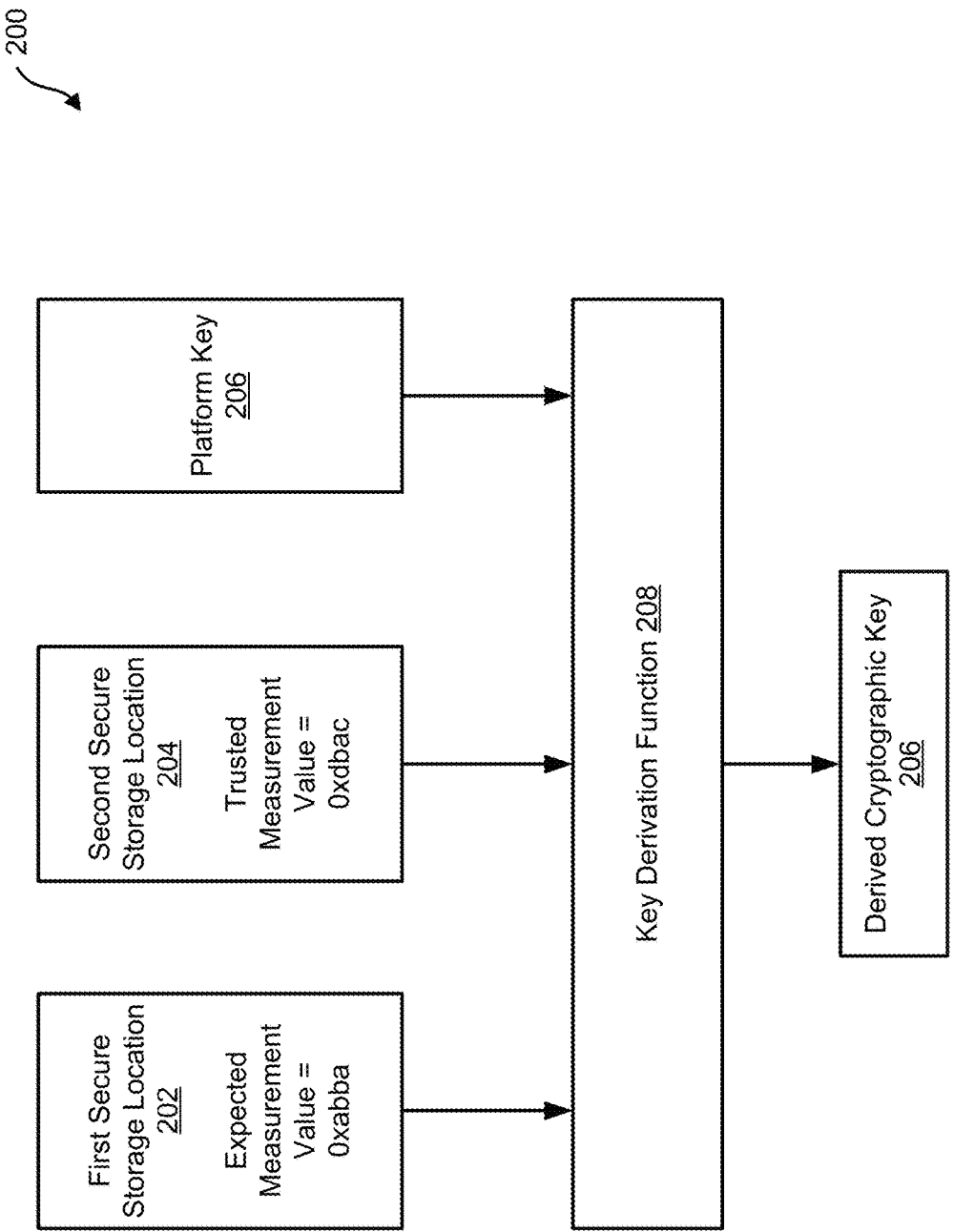
FIG. 2B is a block diagram illustrating an environment for deriving a cryptographic key during a second measurement state, in accordance with one or more examples described herein.

FIGS. 2A and 2B are diagrams illustrating an environment 200 in accordance with one or more examples described herein. In one illustrative example, the environment 200 is an example of the trusted environment 112 of FIG. 1. Certain aspects of examples described herein are set forth below with regards to FIGS. 2A and 2B. The following examples are for explanatory purposes only and not intended to limit the scope of examples described herein. Additionally, while the example shows certain aspects of examples described herein, all possible aspects of such examples may not be illustrated in this particular example. In certain aspects, obscuring details are omitted, such as certain components and devices discussed above in the description of FIG. 1, in order to provide clarity to certain aspects described herein.

FIGS. 2A and 2B are a block diagrams illustrating an example environment 200 in accordance with one or more examples described herein. As shown in FIG. 2A and FIG. 2B, the environment 200 includes a first secure storage location 202 and a second secure storage location 204, which may be the same as or similar to the secure measurement value storage locations 114 and 116 discussed above in the description of FIG. 1. As shown in FIG. 2A and FIG. 2B, the environment 200 also includes a platform key 206, which may, for example, be the same or similar to a platform key discussed above in the description of FIG. 1 and stored in a platform key storage (e.g., the platform key storage 118 of FIG. 1).

FIG. 2A and FIG. 2B also show the environment 200 as including a key derivation function 208. As an example, the key derivation function 208 may be executed, at least in part, using the key derivation component 120 discussed above in the description of FIG. 1. Although not shown in FIG. 2A or FIG. 2B, all or any portions of the components of the environment 200 may be included in or otherwise operatively connected to one or more trusted environments (e.g., the trusted environment 112 of FIG. 1).

In some examples, the first secure storage location 202, the second secure storage location 204, and the platform key 206 may each be configured as inputs to the key derivation function 208. In some examples, the key derivation function 208 processes the values provided as inputs to obtain as an output a derived cryptographic key 210. In some examples, provided the inputs remain the same, the derived cryptographic key 210 may remain the same.

The environment 200 as shown in FIG. 2A is in a first measurement state, as a boot environment during a secure boot process after booting an initial aggregate software image. The initial aggregate software image was used to calculate (e.g., measure) a hash value, and the hash value is combined with another measurement (a register value) to produce an trusted measurement value of 0xabba. This trusted measurement value is stored in a write-once platform control register configured to store a trusted measurement value and then not be re-written (at least until a subsequent boot). The determination to store the trusted measurement value is based at least in part on a version number associated with the initial aggregate software image. In this scenario, the secure boot process includes performing an update of the initial aggregate software image and rebooting to execute an updated aggregate software image. Therefore, a trusted environment (not shown) of the environment 200 obtains an expected measurement value corresponding to the updated aggregate software image that includes a hash value associated with the updated aggregate software image. The expected value, 0xdbac is configured to be stored in the second secure storage location 204. The trusted measurement value, the expected measurement value, and the platform key 206 are used as input to the key derivation function 208 to derive the derived cryptographic key 210, which is used during operation of the initial aggregate software image to perform cryptographic operations on data.

However, the updated aggregate software image will need to use the data on which cryptographic operations may have been performed. Thus, after a reboot, when the updated aggregate software image is executing, the updated aggregate software image requires the same cryptographic keys previous used on the data by the initial aggregate software image. To achieve such a common derived cryptographic key, a similar process for obtaining trusted and expected measurement values as that described above is performed, resulting in the environment 200 as shown in FIG. 2B.

In FIG. 2B, the values stored in the secure storage locations remain the same, but derived in a manner opposite to that described above during the previous boot. Specifically, in some examples, the trusted measurement value calculated during the boot for the updated aggregate software image again uses the hash of the updated aggregate software image, and thus is calculated to be the same as the expected measurement value in the previous boot. Due to a different version number associated with the updated aggregate software image, the trusted measurement value is now stored in the second secure storage location 204. An expected measurement value associated with the initial aggregate software image is obtained, and configured to be stored, during this subsequent boot, in the first secure storage location 202.

Accordingly, the inputs to the key derivation function 208 remain the same between subsequent boots (e.g., two different measurement states), allowing the same derived cryptographic key 210 to be obtained for use by both the initial aggregate software image and the updated aggregate software image.

Although the forgoing example contemplates deriving common cryptographic keys for separate software images during a secure boot process by reversing the order in which trusted and expected measurement values are stored in secure storage locations, one having ordinary skill in the art, and the benefit of this Detailed Description, will appreciate that the technique may apply to any other scenario where two entities require a common cryptographic key to be derived using a key derivation function.

As a simple example, 0xabba may be a serial number of a first component of a computing device, and 0xdbac may be a serial number of a second component of the computing device. The components may require the ability to commonly operate on the same data, some of which may be subjected to a cryptographic operation (e.g., encrypted, requiring decryption later). When the components are booting, a trusted measurement value of the first component that includes the serial number 0xabba may be obtained for the first component, along with an expected measurement value including the serial number 0xdbac of the second component. The computing device may be configured such that, when deriving a cryptographic key for the first component, the trusted measurement value is provided as a first input to a key derivation function, and the expected measurement value may be provided as a second input. These inputs may be combined with a platform key input to generate a derived cryptographic key.

Separately, a trusted measurement value of the second component that includes the serial number 0xdbac may be obtained for the second component, along with an expected measurement value including the serial number 0xabba of the first component. The computing device may be configured such that, when deriving a cryptographic key for the second component, the expected measurement value is provided as a first input to a key derivation function, and the trusted measurement value may be provided as a second input. These inputs may be combined with a platform key input to generate a derived cryptographic key. Thus, in each case, the inputs to the key derivation, and thus the output cryptographic key, remain the same. Therefore, each of the two components may have a common derived cryptographic key for performing cryptographic operations.

Figure 3:
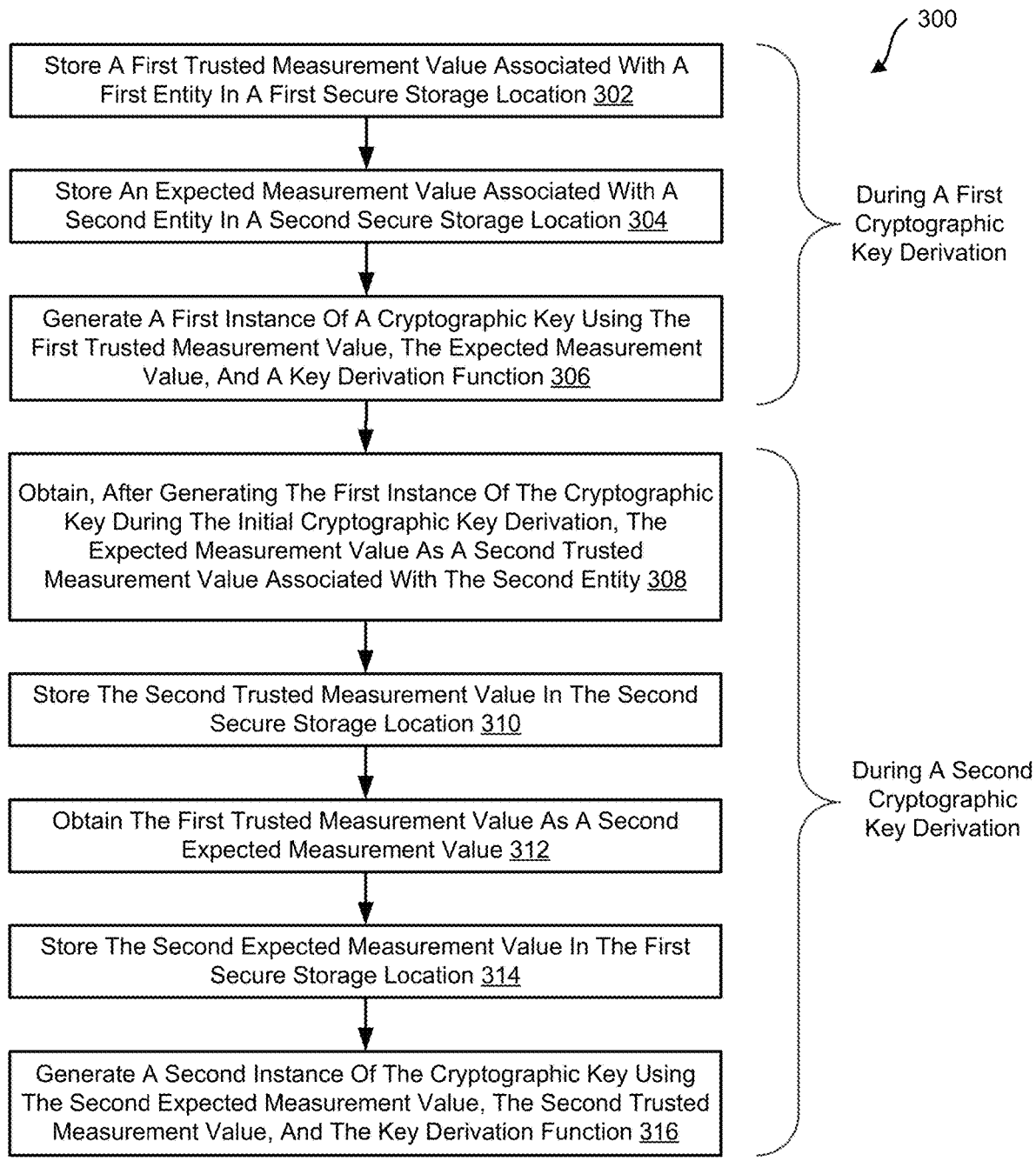
FIG. 3 is a flow diagram illustrating an example of a process for pairwise key establishment between different measurement states, in accordance with one or more examples described herein.

FIG. 3 is a flow diagram illustrating an example of a process 300 for key establishment (e.g., pairwise key establishment between measurement states) in accordance with one or more examples described herein. The process 300 may be performed, at least in part, for example, by a computing device or a component (e.g., a chipset, etc.) of the computing device. In one illustrative example, the process 300 can be performed, at least in part, by the computing device 100 shown in FIG. 1 and described above (or any one or more component or element therein).

At block 302, the computing device (or component thereof) can, during a first (or initial) cryptographic key derivation, store a first trusted measurement value associated with a first entity (e.g., a first software image, a first component, etc.) in a first secure storage location (e.g., secure measurement value storage location A 114). Referring to FIG. 2A as an illustrative example, the first trusted measurement value can be the trusted measurement value 0xabba stored in the first secure storage location 202. In one illustrative example, the first trusted measurement value includes a hash (e.g., a cryptographic hash) of the first software image.

At block 304, the computing device (or component thereof) can, during the first cryptographic key derivation, store an expected measurement value associated with a second entity (e.g., a second software image, a second component, etc.) in a second secure storage location (e.g., secure measurement value storage location B 116). Referring to FIG. 2A as an illustrative example, the expected measurement value can be the expected measurement value 0xdbac stored in the second secure storage location 204. In one illustrative example, the expected measurement value includes a hash (e.g., a cryptographic hash) of the second software image.

In some aspects, when the first entity is a first component and the second entity is a second component, the first trusted measurement value can include a first identifying information item (e.g., a first serial number) associated with the first component and the expected measurement value can include a second identifying information item (e.g., a second serial number) associated with the second component.

At block 306, the computing device (or component thereof) can, during the first cryptographic key derivation, generate a first instance of a cryptographic key (e.g., the derived cryptographic key 206 of FIG. 2A) using the first trusted measurement value, the expected measurement value, and a key derivation function (e.g., the key derivation component 120 of FIG. 1, the key derivation function 208 of FIGS. 2A and/or 2B, and/or other key derivation function).

At block 308, the computing device (or component thereof) can, during a second cryptographic key derivation, obtain, after generating the first instance of the cryptographic key during the first cryptographic key derivation, the expected measurement value as a second trusted measurement value associated with the second entity. At block 310, the computing device (or component thereof) can, during the second cryptographic key derivation, store the second trusted measurement value in the second secure storage location. Referring to FIG. 2B as an illustrative example, the expected measurement value 0xdbac from FIG. 2A is stored as the second trusted measurement value in the second secure storage location 204 in FIG. 2B.

At block 312, the computing device (or component thereof) can, during the second cryptographic key derivation, obtain the first trusted measurement value as a second expected measurement value. At block 314, the computing device (or component thereof) can, during the second cryptographic key derivation, store the second expected measurement value in the first secure storage location. Referring to FIG. 2B as an illustrative example, the trusted measurement value 0xabba from FIG. 2A is stored as the second expected measurement value in the first secure storage location 202 in FIG. 2B.

At block 314, the computing device (or component thereof) can, during the second cryptographic key derivation, generate a second instance of the cryptographic key (e.g., the derived cryptographic key 206 of FIG. 2B) using the second expected measurement value, the second trusted measurement value, and the key derivation function. In some cases, the computing device (or component thereof) can generate the first instance of the cryptographic key and the second instance of the cryptographic key using the key derivation function and using a platform key common to the first entity and the second entity. As noted herein, a platform key can be a cryptographic key available to at least two entities (e.g., the first entity and the second entity) that is a protected secret known only to one or more devices that include the two entities. The platform key can be made available as an input for the key derivation function performed by and/or on behalf of the two entities.

In some aspects, the computing device (or component thereof) can select the first secure storage location during the first cryptographic key derivation for storing the first trusted measurement value based on a parameter associated with the first entity, such as based on a version number of the first entity (e.g., included with the software image etc.), an instruction included with the first entity (e.g., the software image etc.) indicating a particular secure storage location to which the trusted measurement value is to be written, any combination thereof, and/or other parameter(s) or information. In some cases, the computing device (or component thereof) can select the second secure storage location during the second cryptographic key derivation for storing the second trusted measurement value based on a parameter associated with the second entity, such as based on a version number of the second entity (e.g., the software image etc.), an instruction included with the second entity (e.g., included with the software image etc.) indicating a particular secure storage location to which the trusted measurement value is to be written, any combination thereof, and/or other parameter(s) or information.

As noted above, the process 300 and/or any other process described herein may be performed by a computing device or apparatus (e.g., the computing device 100 of FIG. 1, the computing system of FIG. 4, etc.), and/or one or more components therein and/or to which the computing device is operatively connected. The computing device, may be, include, or be a component of any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, a smart speaker, a voice assistant device, a SoC, and/or any other device with the resource capabilities to perform the processes described herein, including the process 500 and/or other process described herein. In some cases, a computing device or apparatus (e.g., that includes a hardware identity impersonator) may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, an RF sensing component, any combination thereof, and/or other component(s). The network interface may be configured to communicate and/or receive Internet Protocol (IP) based data or other type of data.

Figure 4:
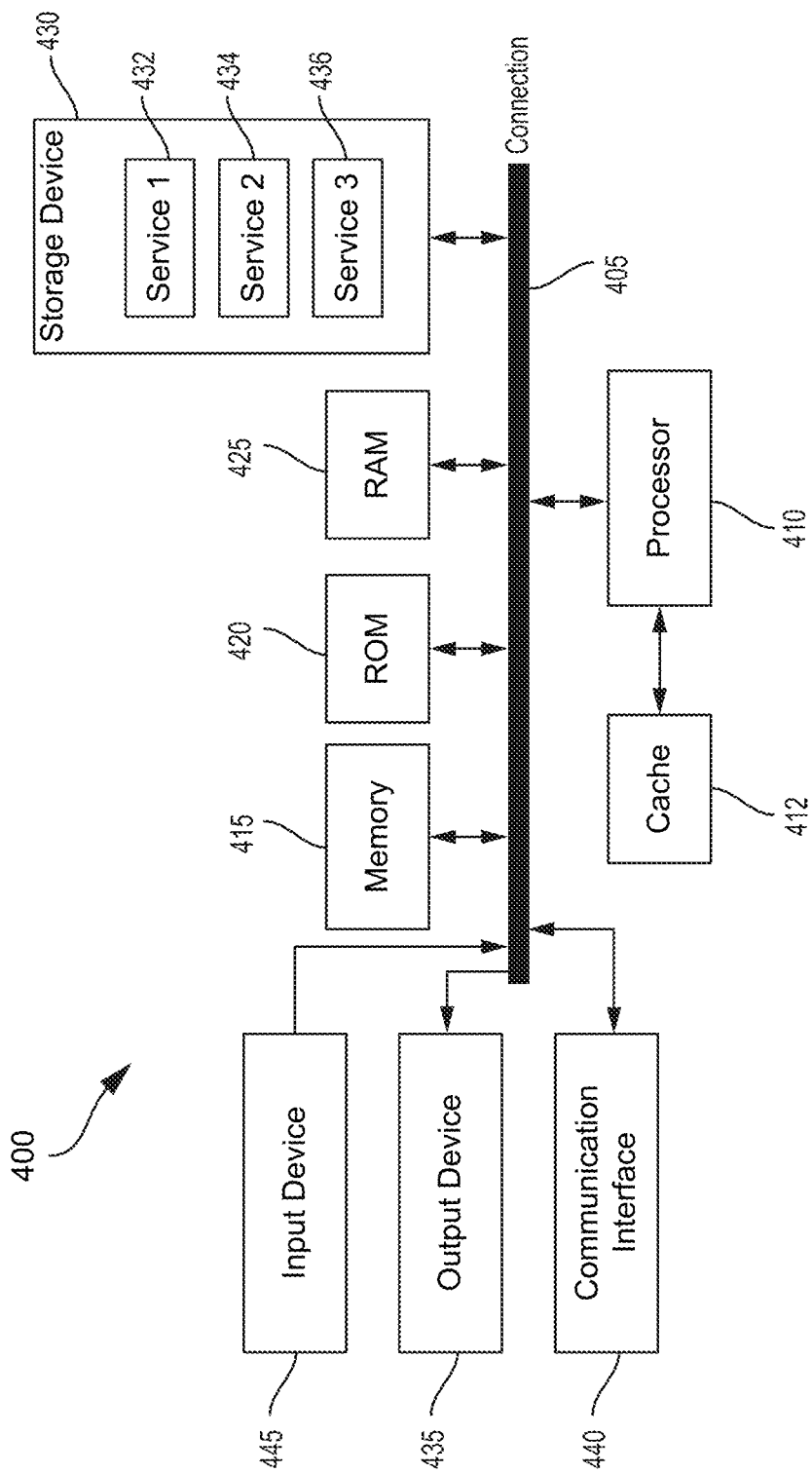
FIG. 4 is a diagram illustrating an example of a computing system for implementing certain aspects described herein.

The components of a computing device (e.g., the computing device 100 of FIG. 1, the computing system 400 of FIG. 4 may be implemented, at least in part, in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), finite state machines, and/or other suitable electronic circuits), and/or can include and/or be implemented, at least in part, using computer software, firmware, or any combination thereof, to perform the various operations described herein.

The process 300 shown in FIG. 3 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 4 is a diagram illustrating an example of a system for implementing certain aspects of the present technology. In particular, FIG. 4 illustrates an example of computing system 400, which can be for example any computing device making up internal computing system, a remote computing system, a camera, or any component thereof in which the components of the system are in communication with each other using connection 405. Connection 405 can be a physical connection using a bus, or a direct connection into processor 410, such as in a chipset architecture. Connection 405 can also be a virtual connection, networked connection, or logical connection.

In some examples, computing system 400 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache 412 of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms or sensors, such as a microphone for speech (e.g., a user speaking), a touch-sensitive screen for gesture or graphical input (e.g., a user performing sign language symbols, a user shaking a phone, etc.), keyboard (e.g., a user pressing a key), mouse, motion input, a determination that a user is in a location indicated by a positioning system or modem sub-system, etc., which may be used to activate counters described in previous sections and enable/disable the asset transmission chain at any stage previously described. Computing system 400 can also include output device 435, which can be one or more of a number of output mechanisms. In some instances, multimodal systems can enable a user to provide multiple types of input/output to communicate with computing system 400. Computing system 400 can include communications interface 440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a Blu-ray® disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof. The storage device 430 can include software instructions or code that can be executed by the processor 410 to cause the system 400 to perform a function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for key establishment, the method comprising: during a first cryptographic key derivation: storing a first trusted measurement value associated with a first entity in a first secure storage location; storing an expected measurement value associated with a second entity in a second secure storage location; and generating a first instance of a cryptographic key using the first trusted measurement value, the expected measurement value, and a key derivation function; and during a second cryptographic key derivation: obtaining, after generating the first instance of the cryptographic key during the first cryptographic key derivation, the expected measurement value as a second trusted measurement value associated with the second entity; storing the second trusted measurement value in the second secure storage location; obtaining the first trusted measurement value as a second expected measurement value; storing the second expected measurement value in the first secure storage location; and generating a second instance of the cryptographic key using the second expected measurement value, the second trusted measurement value, and the key derivation function.

Aspect 2. The method of Aspect 1, wherein the first entity is a first software image, and the second entity is a second software image.

Aspect 3. The method of Aspect 2, wherein the first trusted measurement value includes a hash of the first software image, and the expected measurement value includes a hash of the second software image.

Aspect 4. The method of any one of Aspects 1 to 3, wherein the first entity is a first component, and the second entity is a second component.

Aspect 5. The method of Aspect 4, wherein the first trusted measurement value includes a first identifying information item associated with the first component, and the expected measurement value includes a second identifying information item associated with the second component.

Aspect 6. The method of any one of Aspects 1 to 5, wherein the first secure storage location is selected during the first cryptographic key derivation for storing the first trusted measurement value based on a parameter associated with the first entity.

Aspect 7. The method of any one of Aspects 1 to 6, wherein the second secure storage location is selected during the second cryptographic key derivation for storing the second trusted measurement value based on a parameter associated with the second entity.

Aspect 8. The method of any one of Aspects 1 to 7, wherein generating the first instance of the cryptographic key and the second instance of the cryptographic key comprises using the key derivation function and using a platform key common to the first entity and the second entity.

Aspect 9. An apparatus for key establishment, the apparatus comprising: at least one memory; and at least one processor coupled to the at least one memory and configured to: during a first cryptographic key derivation: cause a first trusted measurement value associated with a first entity to be stored in a first secure storage location; cause an expected measurement value associated with a second entity to be stored in a second secure storage location; and generate a first instance of a cryptographic key using the first trusted measurement value, the expected measurement value, and a key derivation function; and during a second cryptographic key derivation: obtain, after generating the first instance of the cryptographic key during the first cryptographic key derivation, the expected measurement value as a second trusted measurement value associated with the second entity; cause the second trusted measurement value to be stored in the second secure storage location; obtain the first trusted measurement value as a second expected measurement value; cause the second expected measurement value to be stored in the first secure storage location; and generate a second instance of the cryptographic key using the second expected measurement value, the second trusted measurement value, and the key derivation function.

Aspect 10. The apparatus of Aspect 9, wherein the first entity is a first software image, and the second entity is a second software image.

Aspect 11. The apparatus of Aspect 10, wherein the first trusted measurement value includes a hash of the first software image, and the expected measurement value includes a hash of the second software image.

Aspect 12. The apparatus of any one of Aspects 9 to 11, wherein the first entity is a first component, and the second entity is a second component.

Aspect 13. The apparatus of Aspect 12, wherein the first trusted measurement value includes a first identifying information item associated with the first component, and the expected measurement value includes a second identifying information item associated with the second component.

Aspect 14. The apparatus of any one of Aspects 9 to 13, wherein the at least one processor is configured to select the first secure storage location during the first cryptographic key derivation for storing the first trusted measurement value based on a parameter associated with the first entity.

Aspect 15. The apparatus of any one of Aspects 9 to 14, wherein the at least one processor is configured to select the second secure storage location during the second cryptographic key derivation for storing the second trusted measurement value based on a parameter associated with the second entity.

Aspect 16. The apparatus of any one of Aspects 9 to 15, wherein the at least one processor is configured to use the key derivation function and a platform key common to the first entity and the second entity to generate the first instance of the cryptographic key and the second instance of the cryptographic key.

Aspect 17. The apparatus of any one of Aspects 9 to 16, wherein the at least one memory comprises the first secure storage location and the second secure storage location.

Aspect 18. A non-transitory computer-readable medium having stored thereon instructions that, when executed by at least one processor, cause the at least one processor to: during a first cryptographic key derivation: cause a first trusted measurement value associated with a first entity to be stored in a first secure storage location; cause an expected measurement value associated with a second entity to be stored in a second secure storage location; and generate a first instance of a cryptographic key using the first trusted measurement value, the expected measurement value, and a key derivation function; and during a second cryptographic key derivation: obtain, after generating the first instance of the cryptographic key during the first cryptographic key derivation, the expected measurement value as a second trusted measurement value associated with the second entity; cause the second trusted measurement value to be stored in the second secure storage location; obtain the first trusted measurement value as a second expected measurement value; cause the second expected measurement value to be stored in the first secure storage location; and generate a second instance of the cryptographic key using the second expected measurement value, the second trusted measurement value, and the key derivation function.

Aspect 19. The non-transitory computer-readable medium of Aspect 18, wherein the first entity is a first software image, and the second entity is a second software image.

Aspect 20. The non-transitory computer-readable medium of Aspect 19, wherein the first trusted measurement value includes a hash of the first software image, and the expected measurement value includes a hash of the second software image.

Aspect 21. The non-transitory computer-readable medium of any one of Aspects 18 to 20, wherein the first entity is a first component, and the second entity is a second component.

Aspect 22. The non-transitory computer-readable medium of Aspect 21, wherein the first trusted measurement value includes a first identifying information item associated with the first component, and the expected measurement value includes a second identifying information item associated with the second component.

Aspect 23. The non-transitory computer-readable medium of any one of Aspects 18 to 22, wherein the instructions, when executed by the at least one processor, cause the at least one processor to select the first secure storage location during the first cryptographic key derivation for storing the first trusted measurement value based on a parameter associated with the first entity.

Aspect 24. The non-transitory computer-readable medium of any one of Aspects 18 to 23, wherein the instructions, when executed by the at least one processor, cause the at least one processor to select the second secure storage location during the second cryptographic key derivation for storing the second trusted measurement value based on a parameter associated with the second entity.

Aspect 25. The non-transitory computer-readable medium of any one of Aspects 18 to 24, wherein the instructions, when executed by the at least one processor, cause the at least one processor to use the key derivation function and a platform key common to the first entity and the second entity to generate the first instance of the cryptographic key and the second instance of the cryptographic key.

An apparatus for key establishment, the apparatus comprising one or more means for performing operations according to any of Aspects 1 to 8.

What is claimed is:

1. A method for key establishment, the method comprising:
    during a first cryptographic key derivation:
        storing a first trusted measurement value associated with a first entity in a first secure storage location;
        storing an expected measurement value associated with a second entity in a second secure storage location; and
        generating a first instance of a cryptographic key using the first trusted measurement value, the expected measurement value, and a key derivation function; and
    during a second cryptographic key derivation:
        obtaining, after generating the first instance of the cryptographic key during the first cryptographic key derivation, the expected measurement value as a second trusted measurement value associated with the second entity;
        storing the second trusted measurement value in the second secure storage location;
        obtaining the first trusted measurement value as a second expected measurement value;
        storing the second expected measurement value in the first secure storage location; and
        generating a second instance of the cryptographic key using the second expected measurement value, the second trusted measurement value, and the key derivation function.

2. The method of claim 1, wherein the first entity is a first software image, and the second entity is a second software image.

3. The method of claim 2, wherein the first trusted measurement value includes a hash of the first software image, and the expected measurement value includes a hash of the second software image.

4. The method of claim 1, wherein the first entity is a first component, and the second entity is a second component.

5. The method of claim 4, wherein the first trusted measurement value includes a first identifying information item associated with the first component, and the expected measurement value includes a second identifying information item associated with the second component.

6. The method of claim 1, wherein the first secure storage location is selected during the first cryptographic key derivation for storing the first trusted measurement value based on a parameter associated with the first entity.

7. The method of claim 1, wherein the second secure storage location is selected during the second cryptographic key derivation for storing the second trusted measurement value based on a parameter associated with the second entity.

8. The method of claim 1, wherein generating the first instance of the cryptographic key and the second instance of the cryptographic key comprises using the key derivation function and using a platform key common to the first entity and the second entity.

9. An apparatus for key establishment, the apparatus comprising:
    at least one memory; and
    at least one processor coupled to the at least one memory and configured to:
        during a first cryptographic key derivation:
            cause a first trusted measurement value associated with a first entity to be stored in a first secure storage location;
            cause an expected measurement value associated with a second entity to be stored in a second secure storage location; and
            generate a first instance of a cryptographic key using the first trusted measurement value, the expected measurement value, and a key derivation function; and
        during a second cryptographic key derivation:
            obtain, after generating the first instance of the cryptographic key during the first cryptographic key derivation, the expected measurement value as a second trusted measurement value associated with the second entity;
            cause the second trusted measurement value to be stored in the second secure storage location;
            obtain the first trusted measurement value as a second expected measurement value;
            cause the second expected measurement value to be stored in the first secure storage location; and generate a second instance of the cryptographic key using the second expected measurement value, the second trusted measurement value, and the key derivation function.

10. The apparatus of claim 9, wherein the first entity is a first software image, and the second entity is a second software image.

11. The apparatus of claim 10, wherein the first trusted measurement value includes a hash of the first software image, and the expected measurement value includes a hash of the second software image.

12. The apparatus of claim 9, wherein the first entity is a first component, and the second entity is a second component.

13. The apparatus of claim 12, wherein the first trusted measurement value includes a first identifying information item associated with the first component, and the expected measurement value includes a second identifying information item associated with the second component.

14. The apparatus of claim 9, wherein the at least one processor is configured to select the first secure storage location during the first cryptographic key derivation for storing the first trusted measurement value based on a parameter associated with the first entity.

15. The apparatus of claim 9, wherein the at least one processor is configured to select the second secure storage location during the second cryptographic key derivation for storing the second trusted measurement value based on a parameter associated with the second entity.

16. The apparatus of claim 9, wherein the at least one processor is configured to use the key derivation function and a platform key common to the first entity and the second entity to generate the first instance of the cryptographic key and the second instance of the cryptographic key.

17. The apparatus of claim 9, wherein the at least one memory comprises the first secure storage location and the second secure storage location.

18. A non-transitory computer-readable medium having stored thereon instructions that, when executed by at least one processor, cause the at least one processor to:
during a first cryptographic key derivation:
cause a first trusted measurement value associated with a first entity to be stored in a first secure storage location;
cause an expected measurement value associated with a second entity to be stored in a second secure storage location; and
generate a first instance of a cryptographic key using the first trusted measurement value, the expected measurement value, and a key derivation function; and during a second cryptographic key derivation:
obtain, after generating the first instance of the cryptographic key during the first cryptographic key derivation, the expected measurement value as a second trusted measurement value associated with the second entity;
cause the second trusted measurement value to be stored in the second secure storage location;
obtain the first trusted measurement value as a second expected measurement value;
cause the second expected measurement value to be stored in the first secure storage location; and
generate a second instance of the cryptographic key using the second expected measurement value, the second trusted measurement value, and the key derivation function.

19. The non-transitory computer-readable medium of claim 18, wherein the first entity is a first software image, and the second entity is a second software image.

20. The non-transitory computer-readable medium of claim 19, wherein the first trusted measurement value includes a hash of the first software image, and the expected measurement value includes a hash of the second software image.

21. The non-transitory computer-readable medium of claim 18, wherein the first entity is a first component, and the second entity is a second component.

22. The non-transitory computer-readable medium of claim 21, wherein the first trusted measurement value includes a first identifying information item associated with the first component, and the expected measurement value includes a second identifying information item associated with the second component.

23. The non-transitory computer-readable medium of claim 18, wherein the instructions, when executed by the at least one processor, cause the at least one processor to select the first secure storage location during the first cryptographic key derivation for storing the first trusted measurement value based on a parameter associated with the first entity.

24. The non-transitory computer-readable medium of claim 18, wherein the instructions, when executed by the at least one processor, cause the at least one processor to select the second secure storage location during the second cryptographic key derivation for storing the second trusted measurement value based on a parameter associated with the second entity.

25. The non-transitory computer-readable medium of claim 18, wherein the instructions, when executed by the at least one processor, cause the at least one processor to use the key derivation function and a platform key common to the first entity and the second entity to generate the first instance of the cryptographic key and the second instance of the cryptographic key.

* * * * *